United States Patent [19]

McMillan, Jr. et al.

[11] Patent Number: 5,202,200
[45] Date of Patent: Apr. 13, 1993

[54] AUTOMOTIVE AND MARINE BATTERY CONVENIENCE POUCH

[76] Inventors: Alexander McMillan, Jr., 305 Lamport St., Osceola, Ind. 46561; George Spector, 233 Broadway Rm. 3815, New York, N.Y. 10007

[21] Appl. No.: 732,573

[22] Filed: Jul. 18, 1991

[51] Int. Cl.⁵ .............................................. H01M 2/00
[52] U.S. Cl. ...................... 429/187; 424/49; 424/62; 424/65; 424/100; 424/121; 424/176; 16/114 R; 16/DIG. 15
[58] Field of Search ............... 429/187, 65, 49, 176, 429/100, 121, 62; 16/114 R, DIG. 15

[56] References Cited

U.S. PATENT DOCUMENTS 2,933,548  5/1956  Walker ............................... 429/100
3,146,132  8/1964  Nathan ............................... 429/100

Primary Examiner—Olik Chaudhuri
Assistant Examiner—M. Nuzzolillo

[57] ABSTRACT

An automotive battery convenience pouch is provided and consists of a box like housing formed of heat resistant thermal retaining material to help increase the life span of the automotive battery. Handles are disposed on the side walls and top wall of the housing so that a person can mount the automotive battery into an awkward position and carry the housing with one hand. A modification includes a slide fastener, terminal scrapers and a removable handle.

5 Claims, 1 Drawing Sheet

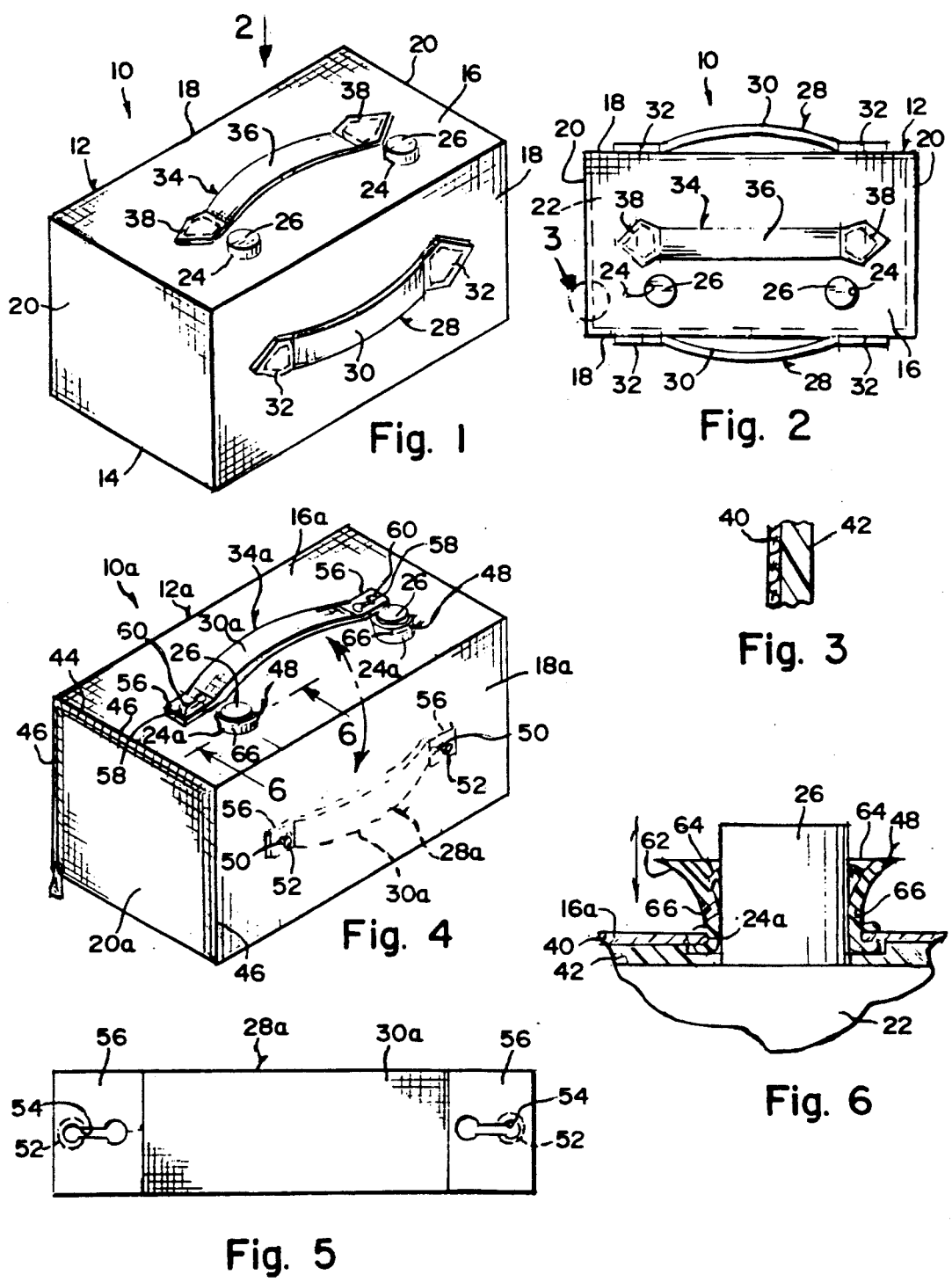

AUTOMOTIVE AND MARINE BATTERY CONVENIENCE POUCH

BACKGROUND OF THE INVENTION

The instant invention relates generally to storage battery cases and more specifically it relates to an automotive battery convenience pouch.

Numerous storage battery cases have been provided in prior art that are adapted to protect batteries that are held within the cases. For example, U.S. Pat. Nos. 1,513,037 to Douglas; 1,696,001 to Gunkel and 3,146,132 to Nathan all are illustrative of such prior art. While these units may be suitable for the particular purpose to which they address, they would not be as suitable for the purposes of the present invention as heretofore described.

SUMMARY OF THE INVENTION

A primary object of the present invention is to provide an automotive battery convenience pouch that will overcome the shortcomings of the prior art devices.

Another object is to provide an automotive battery convenience pouch that is made out of strong heat resistant thermal retaining material to help increase the life span of the automotive battery.

An additional object is to provide an automotive battery convenience pouch that contains built-in scrapers to clean residue away from the material of the automotive battery.

A further object is to provide an automotive battery convenience pouch that is simple and easy to use.

A still further object is to provide an automotive battery convenience pouch that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention.

FIG. 2 is a top plan view as indicated by arrow 2 in FIG. 1.

FIG. 3 is an enlarged cross sectional view of the housing material as indicated by arrow 4 in FIG. 2.

FIG. 4 is a perspective view of a modification having a slide fastener terminal scrapers and a removable handle.

FIG. 5 is a top plan view of the removable handle in greater detail.

FIG. 6 is an enlarged cross sectional view taken along line 6—6 in FIG. 4 showing one of the scrapers having a blade thereon to clean the terminal.

DETAILED DESCRIPTION OF THE PREFERRED EMBODIMENTS

Turning now descriptively to the drawings, in which similar reference characters denote similar elements throughout the several views, FIGS. 1 and 2 illustrate an automotive battery convenience pouch 10 consisting of a box-like housing 12 formed of heat resistant thermal retaining material having a bottom wall 14, a top wall 16, two side walls 18 and two end walls 20 disposed about an automotive battery 22 to help increase the life span of the automotive battery. The top wall 6 has two apertures 24 therein for protrusion of two terminals 26 of the automotive battery 22 therethrough.

Gripping members 28 are provided which are handles 30 affixed at ends 32 on the side walls 18 of the housing 12 so that a person (not shown) can hold the handles 30 to help mount the automotive battery 22 into a awkward position. A lifting member 34 is also provided which is a handle 30 affixed at ends 38 to the top wall 16 of the housing 12 so that a person with one hand can carry the housing 12 with the automotive battery 22 therein.

As shown in FIG. 3, the heat resistant thermal retaining material consists of an outer sheet 40 made of stop rip nylon and a inner liner 42 made of polyethylene insulation.

FIG. 4 shows a modified automotive battery convenience pouch 10a containing a slide fastener 44 secured about three edges 46 of one of the end walls 20a of the housing 12a so as to provide access to the automotive battery 22 within the housing. A cleaning device 48 is carried in each of the apertures 24a in the top wall 16a for cleaning debris from the two terminals 26 of the automotive battery 22.

The gripping member 28a includes a first set of pins 50 having enlarged heads 52 that are longitudinally spaced apart and attached to one of the side walls 18a of the housing 12a. A handle 30a has a bayonet slot 54. (see FIG. 5) formed on each end 56 thereof to engage with each of the pins 50 so that the handle 30a can be removably attached thereto.

The lifting member 34a includes two pins 58 having enlarged heads 60 that are longitudinally spaced apart and attached to the top wall 16a of the housing 12a so that the handle 30a can be removably attached thereto.

The cleaning device 48 is best seen in FIG. 6 and includes a cylindrical elastic scraper member 62 having a wide open top 64 and a plurality of vent holes 66 thereabout. The scraper member 62 is secured into one of the apertures 24a in the top wall 16a of the housing 12a. An annular downwardly bent blade 64 is formed within the scraper member 62 about the vent holes 66 which bears against the terminal 26. When the scraper member 62 is manually pulled up and down the blade 64 will rub against the terminal 26 to loosen the debris which is carried out of the vent holes 66.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An automotive battery convenience pouch comprising:

a) a box-like housing formed of heat resistant thermal retaining material having a bottom wall, a top wall, two side walls and two end walls disposed about an automotive battery to help increase the life span of the automotive battery, said top wall having two apertures therein for protrusion of two terminals of the automotive battery therethrough;

b) a gripping means disposed on at least one said side wall of said housing so that a person can hold said gripping means to help mount the automotive battery into an awkward position; and c) a lifting means disposed on said top wall of said of said housing so that a person with one hand can carry said housing with the automotive battery therein; wherein said heat resistant thermal retaining material comprises:

d) an outer sheet made of nylon;

e) an inner liner made of polyethylene insulation; wherein said gripping means includes at least one handle affixed to at least one said side wall of said housing; wherein said lifting means includes a handle affixed to said top wall of said housing.

2. An automotive battery convenience pouch as recited in claim 1 further comprising:

a) a slide fastener secured about three edges of one of said end walls of said housing so as to provide access to the automotive battery within said housing; and b) terminal cleaning means carried in each of said apertures in said top wall of said housing for cleaning debris from the two terminals of the automotive battery.

3. An automotive battery convenience pouch as recited in claim 2, wherein said gripping means includes:

a) at least two pins, each having an enlarged head, in which said at least two pins are longitudinally spaced apart and attached to one of said side walls of said housing; and b) a handle having a bayonet slot formed on each end thereof to engage with each of said pins so that said handle can be removable attached thereto.

4. An automatic battery convenience pouch as recited in claim 3, wherein said lifting means includes two pins, each having an enlarged head, in which said two pins are longitudinally spaced apart and attached to said top wall of said housing so that said handle can be removably attached thereto.

5. An automotic battery convenience pouch as recited in claim 2 wherein each said terminal cleaning means includes:

a) a cylindrical elastic scraper member having a wide open top and plurality of event holes thereabout, said scraper member secured into one of said apertures in said top wall of said housing; and b) an annular downwardly bent blade formed within said scraper member above said vent holes which bears against the terminal so that when said scraper member is manually pulled up and down said blade will rub against the terminal to loosen the debris which is carried out of said vent holes.

* * * * *